No. 765,268. PATENTED JULY 19, 1904.
C. B. BISHOP.
MACHINE FOR MAKING CUT GLASS.
APPLICATION FILED MAR. 7, 1904.
NO MODEL. 5 SHEETS—SHEET 1.

Witnesses:
Chas. F. Schmelz
Frances Blodgett

Inventor:
C. B. Bishop,
By his Attorney

No. 765,268. PATENTED JULY 19, 1904.
C. B. BISHOP.
MACHINE FOR MAKING CUT GLASS.
APPLICATION FILED MAR. 7, 1904.
NO MODEL. 5 SHEETS—SHEET 5.

Witnesses:
Inventor:
C. B. Bishop,
By his Attorney

No. 765,268. Patented July 19, 1904.

UNITED STATES PATENT OFFICE.

CHARLES B. BISHOP, OF NEW BRITAIN, CONNECTICUT.

MACHINE FOR MAKING CUT GLASS.

SPECIFICATION forming part of Letters Patent No. 765,268, dated July 19, 1904.

Application filed March 7, 1904. Serial No. 196,931. (No model.)

*To all whom it may concern:*

Be it known that I, CHARLES B. BISHOP, a citizen of the United States, residing at New Britain, in the county of Hartford and State of Connecticut, have invented certain new and useful Improvements in Machines for Making Cut Glass, of which the following is a specification.

My invention relates to machines for ornamenting glass or other material, and is primarily designed for manufacturing what is known to the trade as "cut glass."

One of the principal objects of my invention is the provision of a machine in which any required design may be formed upon the glass— *i. e.*, a machine of universal application in the production of ornamental glassware.

A further object of the invention is the provision of a frame carrying the cutter and the follower, said frame being movable to carry the elements mentioned simultaneously over a former and over a blank, the follower and former controlling the operation of the cutter upon the blank.

A further object of the invention is the provision of improved means for sustaining the former and the blank to be ornamented and in connection therewith means for simultaneously turning the spindles carrying said former and said blank.

Other objects of the invention will be hereinafter set forth.

Figure 1:
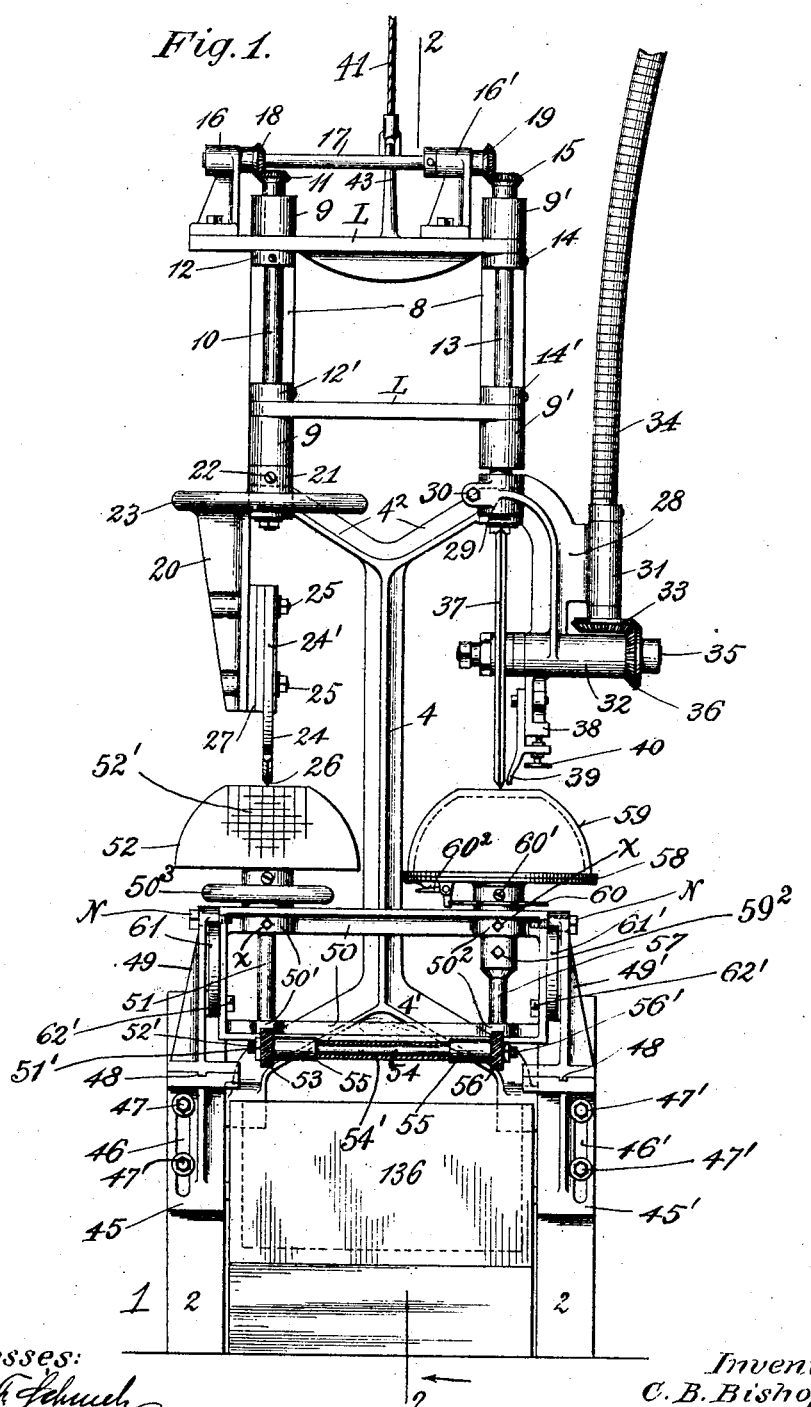
Figure 2:
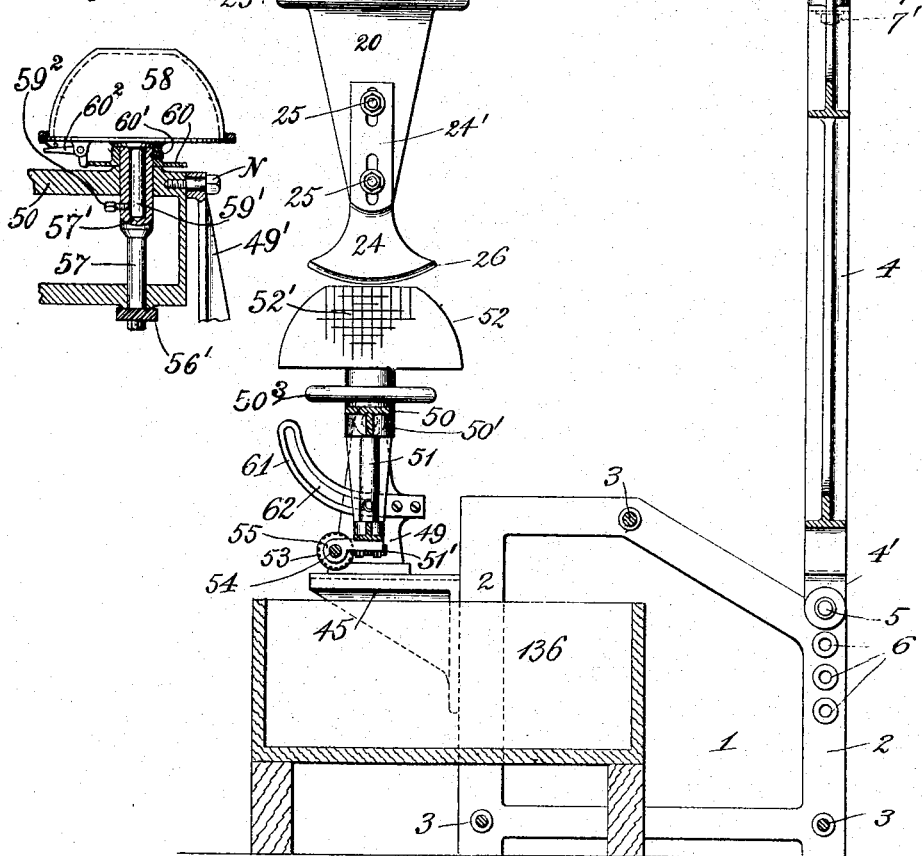
Figure 3:
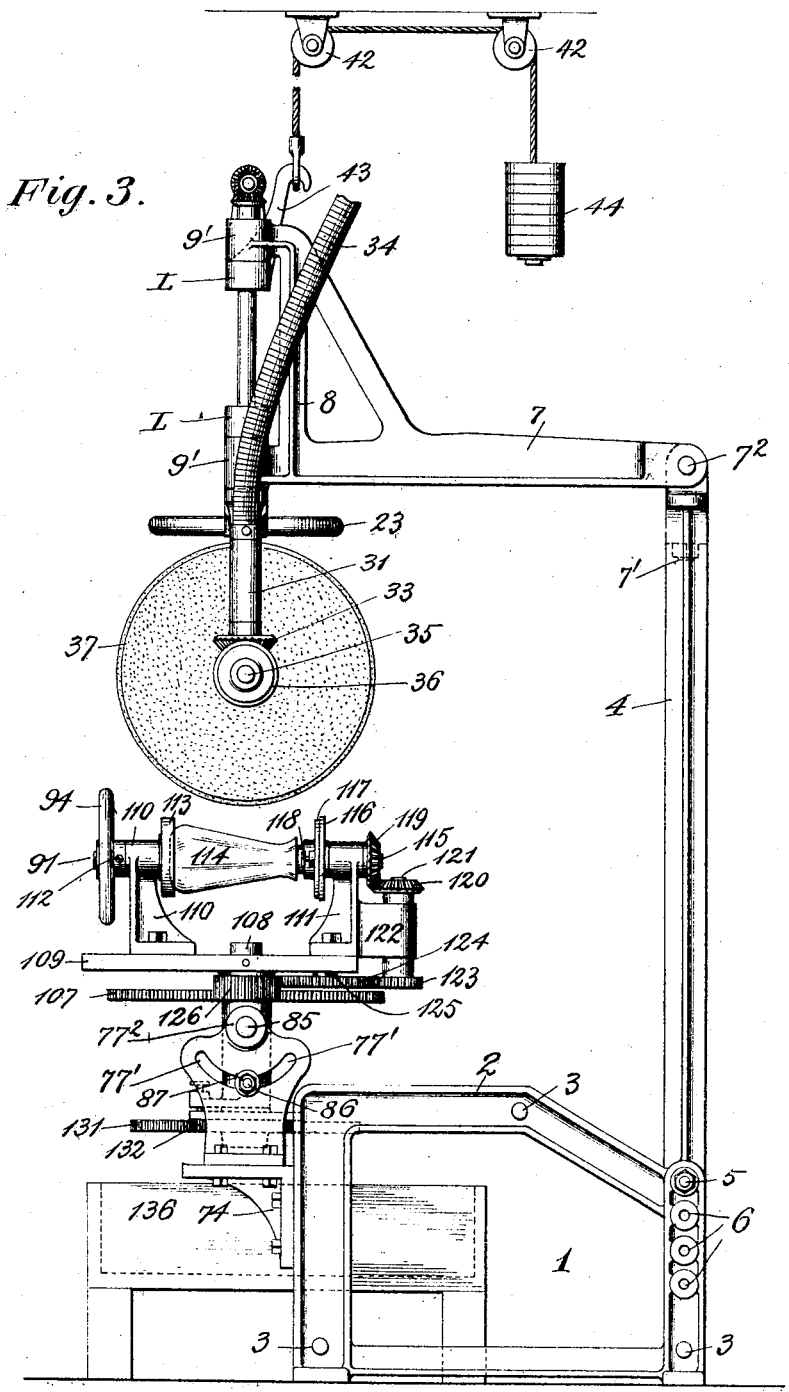
Figure 4:
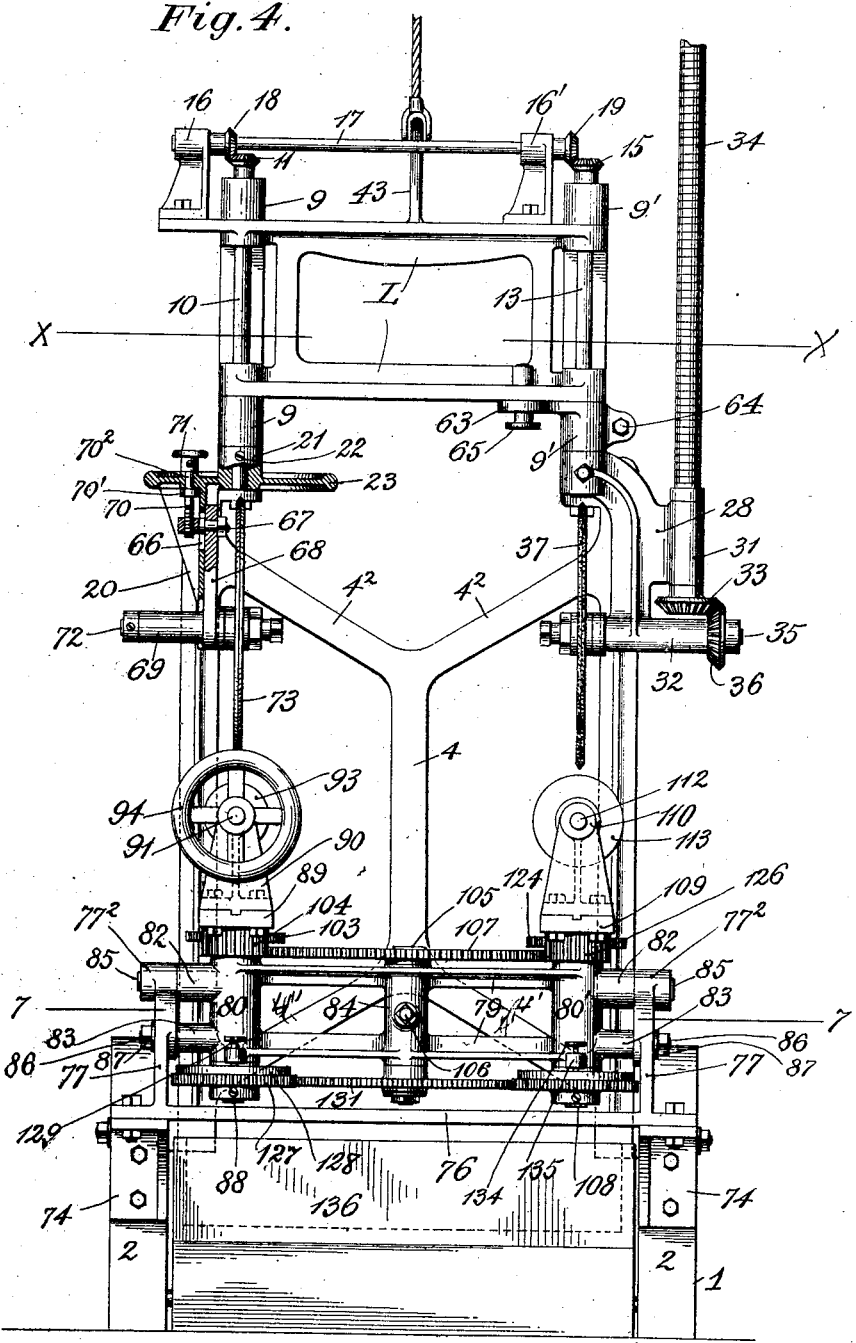
Figure 5:
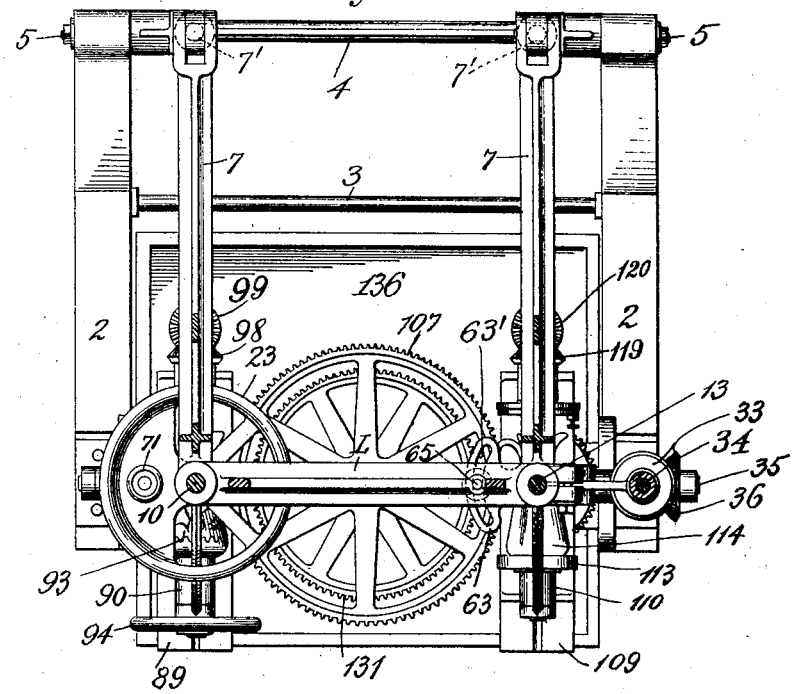
Figure 6:
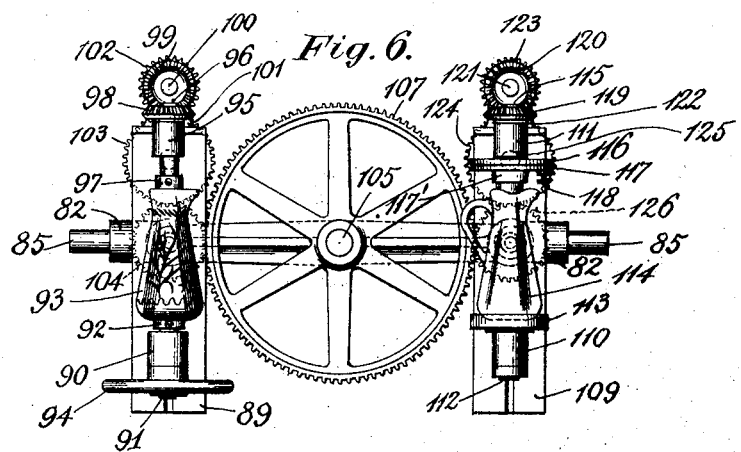
Figure 7:
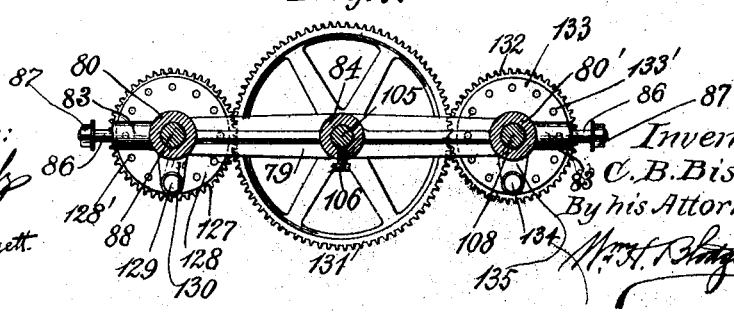

In the accompanying drawings, Figure 1 is a front view of the preferred form of a machine involving the features of my invention. Fig. 2 is a longitudinal vertical section on line 2 2 of Fig. 1. Fig. 2ª is a sectional detail showing the manner in which the blank-holder is supported. Fig. 3 is a side elevation of a modified form of machine. Fig. 4 is a front elevation, partially in section, of the modified machine. Fig. 5 is a plan view of the machine shown with parts in section on line *x x* of Fig. 4. Fig. 6 is a plan view of the work and former support of such machine, and Fig. 7 is a section on line 7 7 of Fig. 4.

Like characters designate similar parts throughout the several views.

Referring to the drawings, the numeral 1 designates a base-frame, which may be of any desired construction, but which is shown composed of skeleton sections 2 2, united by cross-bolts 3 3.

Designated by 4 is a vertical frame, which is bifurcated at its lower end at 4', each arm of the frame being provided with a trunnion 5, adapted to be inserted in any of a series of apertures 6 in the rear vertical standard of each section 2, whereby said frame 4 may be vertically adjusted for a purpose hereinafter stated. At its upper extremity the frame 4 is also forked or bifurcated at 4², and on bolts 7' in the arms of this fork are pivoted arms 7 7, each carrying a vertical head 8, by which the follower and the ornamenting-tool are carried, as will hereinafter appear. This head 8 is of skeleton form and is provided with sets of bearings 9 9'. Journaled in one set of these bearings is a shaft 10, carrying a bevel-gear 11 at its upper end, said shaft being retained against displacement in the bearings by collars 12 12', secured to the shaft and fitted, respectively, under and over the cross-bars or link L of the frame, as shown in Fig. 1. In the other set of bearings, 9', is journaled a shaft 13, to which are secured collars 14 14' for accomplishing the same purpose as the collars 12 12'. This shaft 13 carries a bevel-gear 15 at its upper extremity for a purpose hereinafter stated. Brackets 16 16' are secured to the upper link L, connecting the heads 8, and in these brackets is journaled a shaft 17, carrying bevel-gears 18 and 19, in mesh, respectively, with the gears 11 and 15 of the vertical shafts 10 and 13.

Designated by 20 is a hanger, which is provided with a hub 21 at its upper extremity, said hub being secured to the shaft 10 by a screw 22. Integral with this hub is a hand wheel or grasp 23, and from the latter the hanger 20 depends at one side of the longitudinal axis of the shaft 10. A follower-plate 24, having a slotted shank 24' for the reception of bolts 25, is secured to the hanger 20, and this follower-plate is provided with a curved and sharpened edge 26, adapted to coöperate with a pattern or former hereinafter described. To locate the follower-plate properly with reference to the former, it is supported upon filling pieces or shims 27, through which the bolts 25 pass, as illustrated in Fig. 1.

Designated by 28 is another hanger, which is provided at its upper end with a split hub 29 for the reception of the end of the shaft 13, to which it is clamped by a bolt 30. This hanger 28 is provided with a vertical bearing 31 and with a transverse bearing 32. In the vertical bearing 31 is journaled a shaft carrying a bevel-gear 33, said shaft being driven by a flexible power conveyer or shaft 34, and in the bearing 32 is journaled a shaft 35, carrying a bevel-gear 36, in mesh with the gear 33, driven by the flexible shaft. To the shaft 35 is secured a tool 37, which may be of any desired kind, for acting on the work.

Depending from the bearing 32 is a short hanger 38, upon which is mounted a depth-gage 39, adjusted by means of a screw 40 to regulate the entrance of the ornamenting-tool into the blank.

To counterbalance the pivoted heads 8 and arms 7, a rope 41, passing over sheaves 42, is connected to a hook 43, projecting from the upper cross-bar L, and to the other end of said rope is attached a weight 44.

Adjustably secured to the front ends of the sectional frames 2 are knees 45 45', each knee being slotted at 46 46', respectively, to receive bolts 47 47', respectively, for adjustably securing the knees in place, and each knee is grooved on its top at 48 to receive a tongue depending from a standard 49 49', respectively, as illustrated in Figs. 1 and 2. Pivoted by bolts N between the standards 49 49' is a skeleton frame 50, rectangular in shape, said frame being provided with bearings $50'$ $50^2$ for purposes hereinafter stated.

As shown in Figs. 1 and $2^a$, the bolts N are threaded into the frame 50 and rotate in bearings of the standards 49 49', and by tightening said bolts said frame may be rigidly locked in position when desired to retain the pattern 52 and blank-holder 58 rigidly in the required relation to the follower and the tool.

In the bearings 50' is journaled a shaft 51, carrying a hand-wheel $50^3$, and to the upper end of this shaft is detachably secured a preferably grooved former or pattern 52 for controlling the outline of the design to be produced upon the blank. This pattern is preferably provided with grooves 52' in its surface constituting either a whole design or a part of such design, and when the follower 26 is in engagement with a groove of said pattern it is obvious that a line corresponding to said groove will be formed upon a blank by the tool 37. At its lower end this shaft 51 is provided with a spiral pinion 51', in mesh with a complemental pinion 53, secured to a shaft 54, journaled in bearings 55 of the frame 50. At its opposite end the shaft 54 is equipped with another spiral pinion 56, in mesh with a complemental pinion 56', carried by a shaft 57, to which a chuck or holder 58 for a blank 59 is detachably secured in any desired way. This shaft 57 is enlarged at its upper end at 57', where it passes through a bearing in the upper cross-bar of the frame 50 and extends for a short distance above said cross-bar. This enlarged portion 57' is bored out to form a chamber for the reception of a stem or shank 59' from the blank-holder 58, as illustrated in Fig. $2^a$. A screw $59^2$ serves detachably to secure the blank-holder in its socket in the shaft by bearing against the stem thereof, as also shown in said Fig. $2^a$.

An index-plate 60 is attached to the shaft 57 by a screw 60', and with this plate engages a pawl $60^2$, pivoted to a hanger depending from the blank-support 58, as illustrated in Fig. 1.

Interchangeable formers and blank-supports may be readily placed in the heads at the upper ends of the shafts 51 and 57 and secured therein by screws or otherwise. In other words, the shank or stem 59' of the former or the blank-support is inserted in the head at the upper end of its sustaining-shaft and may readily be removed therefrom and replaced by another when desired.

Arms 61 61', provided with curved slots 62, one of which is shown in Fig. 2, project forwardly from the standards 49 49', and bolts 62 62', carried by the ends of the rectangular frame 50, pass through these slots and serve to secure the frame in position.

Surrounding the shaft 54 between the bearings 55 is a loose tube or sleeve 54', which serves as a convenient hand-grasp for purposes hereinafter stated.

It will be seen that in virtue of this construction the frame 50 may be swung upon its pivots to present the former and the blank-holder at any desired angle to the follower and the ornamenting-tool.

From the above description it will be seen that in virtue of the various connections the arms 7 7 can be swung horizontally, (the bolts 7' rotating in their bearings in frame 4 to permit this movement,) that they can be moved in a vertical arc on their pivots $7^2$ in the bifurcated heads of the bolts, and that the vertical frame 4 can be swung forward and rearward on its trunnions 5, thus presenting the follower and the ornamenting-tool in any required positions with relation to the former and the blank.

By loosening the bolts 62' and grasping the sleeve 54' it is obvious that the frame 50 may be swung on its pivot-bolts N to roll the pattern and the blank-holder underneath the follower edge 26 and the tool 37, as fully set forth in my application filed July 25, 1903, Serial No. 166,995. It will furthermore be evident that by rotating the hand-wheel $50^3$ simultaneously with the rocking movement of the frame 50 the edge 26 of the follower may be made to trace the outline of an inclined or curved groove in the pattern and that the tool 37 will form such a groove in the blank. This pattern may constitute what may be termed a combination "index and pattern," for by swinging the frame composed of the united heads 8 and the arms 7 on the bolts 7' the follower may be made to engage parallel grooves of the pattern, and similar grooves of any desired design may therefore be formed at parallel indexed spaces in the surface of the blank, and said grooves may extend across the blank at an angle to the periphery thereof or in a serpentine or other path, according to the development of the groove in the pattern 52, and these grooves may be properly indexed on the blank, and thus made to conform exactly to the design or the part of the design carried by the pattern.

The invention is not limited to grooves on the pattern, for other means may be devised for causing the follower to engage said pattern on the line or lines desired without departure therefrom.

It frequently happens that it is necessary to produce on opposite sides of a blank similar lines or grooves, and this can be readily accomplished by loosening the screw $59^2$ in shaft 57, releasing the pawl or detent 60', and rotating the blank-holder (the stem 59' of which fits in the socket of the shaft 57) until the other side of the blank is presented to the action of the tool, after which said screw will be set up firmly to clamp the stem 59' in place for a replica of the operation first produced. This independent indexing of the blank is also important to enable parallel stepped cuts of any desired outline to be produced upon such blank by the ornamenting-tool.

Means are also presented for rigidly securing the shafts 51 and 57 in place, if desired, while the follower is acting upon the pattern and the blank is in contact with the wheel, and these means are shown as screws $x$, passing through the upper bearings 50 50' and engaging the shaft 51 and the enlarged portion 57' of the shaft 57, as illustrated in Fig. 1.

As the arms 7 7 are united by the links L at their forward ends, they must have a parallel motion when swung horizontally to the desired angle, and to lock them when adjusted the lower bearing 9' has an arm 63, provided with an arcuate slot 63'. Threaded into the lower link L is a bolt 65, the stem of which passes through the slot 63', and as the arms and frame are swung the bolt will travel in the slot, and after the desired adjustment has been obtained the bolt is set up to clamp its head against the under side of the arm 63, and thus lock the parts in their adjusted positions. This bearing is split, and when it is desired to lock the shaft 13 against rotation to hold the tool 37 in fixed relation to the work the bearing is compressed on said shaft by a screw 64.

In the modified apparatus the hand-wheel 23 is secured to shaft 10 in the same manner as in Figs. 1 and 2; but the hanger 20', depending from said wheel, is slotted at 66 to receive the stem of a bolt 67, carried by an extension 68 of a bearing 69. In its head portion this bolt is internally threaded to receive a screw 70, having a collar 70' bearing against the under side of the wheel 23 and above said collar a stem $70^2$, passing through said wheel. To the stem of this bolt is secured a head 71, by which the screw may be turned to adjust the bearing 69 either up or down, as desired. Journaled in said bearing 69 is a shaft 72, to which a follower-wheel 79 is secured, as shown in Fig. 4.

In the modified machine knees 74 are secured to the uprights 2 2 of the frame 1, and to said knees is bolted a frame comprising a base-plate 76 and vertical end plates or standards 77, each provided with a curved slot 77' and with a bearing $77^2$.

Between the standards 77 is located a frame or carrier, (designated generally by 79,) and it is provided with vertical bearings 80 80', connected by cross-webs 81 with tubular bosses 82 83 and with a central bearing 84. Trunnions 85, projecting inwardly from the bearings $77^2$ of standards 77, receive the bosses 82, and bolts 86 extend from the bosses 83, pass through the curved slots 77' of standards 77, and are provided with nuts 87.

In the bearings 80 is mounted a shaft 88, carrying at its upper portion a bed-plate 89, upon which is adjustably mounted a head-stock 90. In this stock is journaled a short shaft 91, having detachably secured to its inner end a chuck 92 for the reception of one end of a form or pattern 93. In Figs. 5 and 6 the form represented is that of a pitcher, and the head 92 is cup-shaped to receive the closed end thereof; but, as will be obvious, the shape of the chuck or holder 92 may be adapted to any form it is desired to employ. For turning the shaft 91 a hand-wheel 94, secured to the rear end of said shaft just beyond the stock, is employed, although other means for accomplishing this result either manually or automatically may be used, if desired.

At the inner end of the bed-plate 89 is mounted a tail-stock 95, and journaled in said stock is a shaft 96, having at its inner extremity a detachable chuck block or support 97, adapted to fit against the inner end of the form or pattern 93.

Beyond the tail-stock the shaft 96 is provided with a bevel-gear 98, in mesh with a like gear 99, the latter being carried by a short shaft 100, journaled in a bracket 101, projecting from the end of the bed-plate 89. At its lower end the shaft 100 carries a spur-gear 102, in mesh with an idler 103, loose on a stud depending from the bed-plate, as shown in Figs. 4 and 6. This idler in turn meshes with a wide pinion 104, loosely mounted on the shaft 88 above the bearing 80. Loose on a shaft 105, secured in the bearing 84 by a screw 106, is a large spur-gear 107, in mesh with the wide pinion 104.

Journaled in the bearing 80' of frame 79 is a shaft 108, to the upper end of which is keyed a bed-plate 109, and on this bed-plate are mounted a head-stock 110 and a tail-stock 111. In the head-stock, which, like the stock 90, is adjustable on the bed-plate, is journaled a shaft 112, carrying a face-plate or chuck-head 113, shaped to engage one end of the blank 114 (shown as a pitcher) to be ornamented.

A shaft 115 is journaled in the tail-stock 111, and said shaft carries at its inner end a face-plate 116, and sleeved upon its end adjacent to said face-plate is an index-plate 117, having a hub 117', provided with a chuck-block for entering the open end of the blank. Normally the index-plate is locked to the face-plate 116 by the usual pin or plunger 118, which enters any of a series of openings therein; but should it be desired to index the blank while supported between the head and tail stocks this pin will be withdrawn and the index-plate turned until the blank is brought to the required position, when said pin will engage another hole in the face-plate.

Fixed to the outer end of shaft 115 is a bevel-gear 119, and this gear is in mesh with a bevel-pinion 120, secured to a shaft 121, journaled in a bracket 122, projecting from the tail-stock 111, these parts being identical with those carried by the bed-plate 89 and above described. At its lower end the shaft 121 carries a spur-gear 123, in mesh with a larger idler-pinion 124, loosely mounted on a stud 125 on bed-plate 109. Loose on the shaft 108 below the bed-plate 109 is a wide pinion 126, in engagement with the idler 124, and this pinion, like the pinion 104, is in mesh with the large idler spur-pinion 107. From what has been stated it will be seen that when the hand-wheel 94 is turned to rotate the form or pattern 93 the blank 114 will through the shafts and gearing described be simultaneously actuated in the same direction.

As above stated, the bed-plates 89 and 109 are secured, respectively, to the shafts 88 and 108, and the pattern and blank supporting devices are carried by said bed-plates.

In the formation of some designs it is necessary to rotate the shafts 88 and 108 step by step to present the form or pattern and the blank to be ornamented at various angles to a horizontal plane and to lock the parts against movement while the follower and ornamenting-tool are in contact simultaneously with the pattern and with the work. To accomplish this result, a gear-wheel 127 is secured to the shaft 88, and it is provided with an index-plate 128, having a series of regularly-spaced holes 128' for the reception of a pin 129, mounted in a bracket 130, projecting from the boss or bearing 80, as shown in Figs. 4 and 7. Gear 127 is in mesh with a large gear 131, loosely mounted on the lower end of the stationary shaft 105, and this idler-gear engages with a gear 132, secured to the shaft 108 and carrying an index-plate 133, provided with regularly-spaced apertures 133' for the reception of a spring-actuated pin or plunger 134, mounted in a bracket 135, projecting from the bearing 80', as also shown in Figs. 4 and 7. By withdrawing the plungers 129 and 134 and grasping and turning the wheel 131 it will be seen that the shafts 88 and 108 will be rotated to present the bed-plates and the patterns and blank carried thereby simultaneously to the required parallel angles. A silt-retaining box 136 may be readily inserted between the sections 2 2 of the frame, as shown in Figs. 1 and 2.

While particular gearing is illustrated and described for intermittingly indexing the shafts 88 and 108 and for simultaneously rotating the pattern and the blank, it is distinctly to be understood I do not limit myself thereto, for other mechanisms may be employed for accomplishing these results without departure from the invention.

In the operation of the form of my invention illustrated in Figs. 1 and 2 a pattern 52 of the desired outline and having formed on its surface the design or part of a design to be reproduced on the blank is secured to the shaft 51, and a chuck or holder 58, carrying a blank 59, is attached to the shaft 57. The frame is then lowered to bring the follower 26 in contact with the pattern and the ornamenting-tool 37 into engagement with the blank 59, after which any movement desired may be given to the frame carrying the follower and ornamenting-tool and to the blank and pattern shafts. Furthermore, the pattern and blank spindles may be simultaneously rotated by turning the hand-wheel $50^3$ of shaft 51, and thus produce a relative compound movement of the pattern and blank and the follower and ornamenting-tool. By loosening the bolts 62' 62' the frame 50 may be tilted on its pivots to the desired angle and then secured in place, said bolts passing through the arcuate slots 62 of the arms 61, as above stated.

Forms and blank-holders of various sizes may be readily fitted to the spindles, and provision is made for raising and lowering the knees 45 45' and the frame 4 and its connected frame 8, as above described.

In the modified machine the frame 79 may be rocked to either side of its axis and then secured in position by the nuts 87, thus presenting the bed-plates 89 and 109 to any required angular position, and the chucks or holders for the pattern and blanks may be simultaneously rotated axially when desired.

If desired, the gearing may be incased in housings to protect it from the sand and water falling into the box 136 from the usual hopper and spout. (Not shown.)

Tools of any suitable kind may be substituted for the one shown.

Changes may be made in the form and proportions of the various parts and framework of any required form may be employed without departure from the invention.

Having thus described my invention, what I claim is—

1. The combination, with a support, of a tool carried by the support; means whereby the support may be actuated to impart universal movements to said tool; a frame mounted for swinging movement; and a blank-holder carried by said frame.

2. The combination, with a support, of an ornamenting-tool carried thereby; a follower also carried by the support; and means whereby universal movements may be imparted to said support.

3. The combination, with a support, of a rotary tool carried thereby, means for imparting universal movements to said support; a follower carried by the support; and blank-holding and pattern mechanisms coöperating with said tool and follower.

4. The combination, with a blank-holder, of a support; a tool carried by the support for operating on the blank sustained by the blank-holder; and means whereby universal movements may be imparted to the support.

5. The combination, with a pattern and a blank-holder, of a support; a follower carried by the support and coöperating with the pattern; a tool carried by the support for operating on the blank; and means whereby universal movements may be imparted to the support.

6. The combination, with a frame, of a pattern carried by said frame; means for holding a blank also carried by the frame; a support; a follower mounted on the support and coöperating with the pattern; a tool for acting on the blank also carried by the support; and means whereby universal movements may be imparted to the support.

7. The combination, with an adjustable frame, of means for holding a pattern on said frame; means for holding a blank on the frame; a universally-movable support; a follower carried by said support, and coöperating with the pattern; and a tool for operating upon the blank also carried by the support.

8. The combination, with a pivoted frame, of means whereby said frame may be adjusted and then secured in position; a universally-movable frame; a follower carried by the universally-movable frame and adapted to coöperate with the pattern; and a tool for acting upon the blank also carried by the frame.

9. The combination, with a frame, of blank-holding and pattern-holding devices carried by said frame; a support mounted for universal movement above the frame; a follower carried by said support, and coöperating with the pattern; and a tool for acting on the blank on lines controlled by the follower and pattern.

10. The combination, with a frame, of pattern and blank holding devices carried thereby; a support; a follower mounted on the support, and coöperating with the pattern; a tool also mounted on the support and adapted to engage the blank; means whereby the support may be actuated toward and from the frame; and means whereby said support may be adjusted laterally to change the positions of the follower and tool with relation to the pattern and blank.

11. The combination, with a frame mounted to swing in a horizontal plane, said frame having bearings, of shafts journaled in said bearings; a follower secured to one of the shafts; a tool carried by the other shaft; a pattern coöperating with the follower; a device for holding a blank to be operated on by the tool; and a frame for sustaining the pattern and blank-holding device.

12. The combination, with a pair of horizontally-movable arms, each having a head, of shafts carried by the heads; means for connecting the heads; means for simultaneously rotating the shafts; a follower carried by one shaft; a tool carried by the other shaft; and pattern and blank holding devices coöperating with the follower and tool.

13. The combination, with a frame composed of united arms, each having a head, of a shaft journaled in each head; gearing for simultaneously rotating the shafts; a follower carried by one shaft; a tool carried by the other shaft; pattern and blank holding devices coöperating with the follower and tool; and means for mounting the arms so that they may have universal movements.

14. The combination, with a swinging frame, of a follower carried by said frame; a pattern coöperating with the follower; a rotary tool carried by the frame; a flexible shaft and gearing for actuating said tool; and means for holding a blank to receive the action of the tool.

15. The combination, with a swinging frame, of arms pivoted to said frame; a follower carried by one arm; a tool mounted in the other arm; a pattern coöperating with the follower; and a blank-holding device coöperating with the tool.

16. The combination, with a swinging frame, of arms connected to said frame for vertical and horizontal movement thereon; a follower carried by one arm; a tool mounted on the other arm; a pattern with which the follower coöperates; and means for sustaining a blank to be operated on by the tool.

17. The combination, with a swinging frame, of bolts journaled in the upper part thereof; arms pivoted to said bolts; a follower carried by one of the arms; a tool carried by the other arm; a pattern; and means for sustaining a blank to be operated on by the tool.

18. The combination, with a universally-mounted support, of a follower carried by said support; a rotary tool also carried by the support; a pivoted frame below the support; means for adjusting said frame upon its pivots; a pattern carried by the frame; blank-holding means mounted on said frame; and devices for axially rotating the pattern and the blank-holding means.

19. The combination, with a universally-mounted support, of shafts journaled in said support; a follower carried by one shaft; a tool carried by the other shaft; means for rotating the tool; means for simultaneously actuating the shafts angularly to adjust the follower and tool; a pattern with which the follower coöperates; and means for holding a blank to be operated on by the tool.

20. In a machine of the class described, the combination, with a pair of horizontally and vertically pivoted arms, of shafts journaled in said arms; means for simultaneously rotating said shafts; a follower carried by one shaft; a hanger secured to the other shaft; a tool-shaft journaled in said hanger; a tool carried by the tool-shaft; means for driving the tool-shaft; a pattern; and a blank-holder.

21. The combination, with framework, of a frame pivoted thereto; arms articulated to the upper end of said frame; a follower carried by one arm; a tool carried by the other arm; a frame located below the arms; a pattern carried by said frame; means also carried by the frame for holding a blank; and mechanism for simultaneously adjusting the pattern and the blank-holding means with relation to the follower and the tool.

22. The combination, with standards, of a frame pivoted thereto; means for clamping said frame when swung on its pivots; a pattern carried by the frame; a blank-support also carried by the frame; and mechanism for axially turning the pattern and the blank-support.

23. The combination, with standards having curved slots, of a frame pivoted between the upper ends of said standards; a pattern rotatively mounted in the frame; a blank-support also rotatably mounted in the frame; gearing for simultaneously turning the pattern and the blank-holding means; a movably-mounted follower coöperating with the pattern; and a rotary tool for acting on the blank held by the blank-support.

24. The combination, with a pivoted standard having bifurcated upper and lower ends, of bolts journaled in one extremity of said standard; arms pivoted to said bolts, each arm having a head provided with bearings; shafts journaled in said bearings; means for connecting the heads of the arms so that they may have a horizontal swinging movement; a hanger secured to one of said shafts; a follower carried by the hanger; a second hanger secured to the other shaft and having a bearing; a rotary tool journaled in said bearing; a flexible shaft; gearing for driving said tool; and means for simultaneously turning the shafts.

25. The combination, with a pivoted standard having bifurcated upper and lower ends, of bolts journaled in one extremity of said standards; arms pivoted to said bolts, each arm having a head provided with bearings; shafts journaled in said bearings; means for connecting the heads of the arms so that they may have a horizontal swinging movement; a hanger secured to one of said shafts; a follower carried by the hanger; a second hanger secured to the other shaft and having a bearing; a rotary tool journaled in said bearings; a flexible shaft; gearing for driving said tool; means for simultaneously turning the shafts; a frame mounted below the arms; a pattern carried by said frame; a blank-support also carried by said frame; and means for axially and simultaneously rotating the pattern and the blank-support.

26. The combination, with a sectional frame, each section having a series of apertures, of a vertical standard; means for pivoting said standard in any of said apertures; bolts having shanks journaled in the upper end of said standard; arms pivoted to said bolts, and each having a head provided with bearings; vertical shafts journaled in said bearings and having gears at their upper ends; a hand-wheel secured on one of the vertical shafts; a hanger depending from said hand-wheel; a follower carried by the hanger; devices for uniting the heads; a transverse shaft carried by one of said devices; gearing on said shaft in mesh with the gears of the vertical shafts; a hanger secured to the other vertical shaft and provided with a bearing; a rotary wheel having a shaft journaled in said bearing; means for driving said wheel, a pattern; a blank-support; and means for sustaining said pattern and said blank-support.

27. The combination, with a pair of vertically and horizontally movable arms, each having a head provided with bearings; of means for connecting said head so that the arms may have a horizontal movement; means for counterbalancing the heads; vertical shafts mounted in the bearings of each head and having gears at their upper extremities; a transverse shaft having gears in mesh with the gears of the vertical shaft; means for rotating one of the vertical shafts; a hanger depending from one of said vertical shafts; a follower carried by said hanger; a follower depending from the other vertical shaft; a tool carried by said hanger; a pattern; a blank-support; and a frame in which said pattern and blank-support are mounted.

28. The combination, with a tool and with means for actuating the same, of a blank-support; and means whereby said blank-support may be simultaneously rocked and axially rotated with relation to the tool.

29. The combination, with a tool, of means for universally adjusting said tool; a blank-support; a pattern; a follower; and means whereby synchronous rocking and rotative movements may be imparted to the pattern and blank-support.

30. The combination, with a tool, of means for rotating said tool; a follower; a pattern; a blank-support; means for actuating the tool and follower toward and from the pattern and blank-support; a swinging frame carrying the pattern and blank-support; and means for simultaneously rotating the pattern and blank-support.

31. The combination, with a tool, and with means for actuating the same, of a follower; means whereby said follower may be adjusted; a pattern with which the follower coöperates; a tool; a blank-support; means for simultaneously swinging the pattern and the blank-support; and means for synchronously rotating said pattern and said blank-support.

32. The combination, with a movable support, of a follower carried by said support; a tool also carried by the support; a pattern; a blank-support; a frame in which the pattern and blank-support are rotatively mounted; and means whereby the blank-support may be indexed without disturbing said pattern.

33. The combination, with a pivoted frame, of a blank-support rotatively mounted in said frame; means for individually indexing said blank-support; a tool; a follower; a pattern; and means for also simultaneously indexing the pattern and the blank-support.

34. The combination, with a universally-movable support, of a follower carried by said support; means whereby the follower may be vertically adjusted; a pattern coöperating with the follower; and means for actuating said pattern.

35. The combination, with a pair of universally-adjustable supports, of a follower carried by one of said supports; means whereby said follower may be vertically adjusted; means for axially actuating the follower; a tool carried by the other support; a pattern coöperating with the follower; a blank-holder coöperating with the tool; and means whereby the pattern and blank-holder may be swung over the surfaces of the follower.

36. The combination, with a pair of universally-mounted arms having bearings, of links connecting said arms; shafts journaled in the bearings of the arms; gearing connecting said shafts; a follower carried by one of the shafts; a tool carried by the other shaft; means for simultaneously adjusting the follower and tool; a pivoted frame; a pattern mounted for rotative movement on said frame; a blank-support also mounted for rotative movement on the frame; and gearing for connecting the pattern and the work-holder.

37. The combination, with a swinging frame bifurcated at its upper end, of bolts having bifurcated heads swiveled in said head; arms pivoted to the bolts; a follower carried by one of the arms; a tool carried by the other arm; means for synchronously adjusting the follower and tool; a grooved pattern with which the follower coöperates; a blank-support; a swinging frame carrying the pattern and blank-support; and means whereby said frame may be locked when swung to any desired position.

In testimony whereof I affix my signature in presence of two witnesses.

CHARLES B. BISHOP.

Witnesses:
F. E. ANDERSON,
FRANCES E. BLODGETT.